United States Patent [19]

Ochs

[11] Patent Number: 4,636,771
[45] Date of Patent: Jan. 13, 1987

[54] POWER LINE COMMUNICATIONS TERMINAL AND INTERFACE CIRCUIT ASSOCIATED THEREWITH

[75] Inventor: Garrold W. Ochs, Nokesville, Va.

[73] Assignee: Westinghouse Electric Corp., Pittsburgh, Pa.

[21] Appl. No.: 680,211

[22] Filed: Dec. 10, 1984

[51] Int. Cl.$^4$ .................... H04M 11/04; H04M 11/08
[52] U.S. Cl. .................... 340/310 CP; 307/3; 333/32; 340/310 A; 340/310 R; 379/66
[58] Field of Search ........ 340/310 A, 310 R, 310 CP; 361/64; 455/69, 78, 79; 179/2.51; 307/3, 140; 333/32, 170

[56] References Cited

U.S. PATENT DOCUMENTS

| | | | |
|---|---|---|---|
| 3,720,878 | 3/1973 | Rosenberry | 333/32 |
| 3,754,196 | 8/1973 | Collins | 333/32 |
| 3,984,774 | 10/1976 | De Hart | 455/69 |
| 4,017,845 | 4/1977 | Kilian et al. | 340/310 R |
| 4,090,154 | 5/1978 | Hauchart | 333/32 |
| 4,101,834 | 7/1978 | Stutt et al. | 340/310 A |
| 4,130,861 | 12/1978 | LaForest | 340/310 R |
| 4,142,178 | 2/1979 | Whyte et al. | 340/310 R |
| 4,300,126 | 11/1981 | Gajjar | 340/310 A |
| 4,408,186 | 10/1983 | Howell | 340/310 CP |
| 4,451,801 | 5/1984 | Monticelli | 340/310 R |
| 4,471,399 | 9/1984 | Udren | 340/310 A |
| 4,556,864 | 12/1985 | Roy | 340/310 CP |
| 4,558,285 | 12/1985 | Shrestha et al. | 333/32 |

Primary Examiner—James L. Rowland
Assistant Examiner—Brent A. Swarthout
Attorney, Agent, or Firm—W. E Zitelli

[57] ABSTRACT

A communications terminal for transmitting and receiving communication signals over a power line communications network and including an interface circuit for coupling the terminal to the power line of the network is disclosed. One embodiment of the network includes a transformer for coupling communication signals between the power line and terminal. The coupled communication signals are measured from the secondary of the transformer and used to govern an amplifier circuit which generates matched signals, representative of the measured communication signals. The matched signals are inverted in polarity at the output stage of the amplifier and applied to the secondary winding of the transformer to cancel substantially the electromagnetically coupled communication signals from the power line, thereby providing a high bridging impedance to the power line communication signals without impeding substantially the coupling of the terminal's own communication signals.

10 Claims, 3 Drawing Figures

POWER LINE COMMUNICATIONS TERMINAL AND INTERFACE CIRCUIT ASSOCIATED THEREWITH

BACKGROUND OF THE INVENTION

The present invention relates generally to multi-channel distributed power line communication systems in general and, more specifically, to a communications terminal and an interface circuit coupled between the power line and communications terminal for providing high wide band frequency bridging impedance to communication signals present on the power line without impeding substantially the transmission and reception communication signals of the terminal.

It is generally cost prohibitive for a telephone company to service individual telephone subscribers in a sparsely populated region, like in some rural communities where the residents are separated by distances of miles. Since most, if not all, of these rural residents are equipped with power line service from a local utility, it has been proposed to provide telephone service to these subscribers by employing a frequency division multiplex telephone communication system which utilizes the power line servicing the community as the transmission carrier medium.

In some rural communities, the individual resident subscribers may be clumped together in a central location permitting their subscriber terminals to be grouped together. In this situation, the grouping of subscriber terminals may share a common power line interface, face, e.g. line tuner and line coupler pair, for bidirectional communication over the power line. Thus, the cost of an individual terminal interconnection may be kept low because the expense of the line filter and coupler pair may be allocated among the group of subscribers. However, in those rural communities where the residents are not clumped together but spread over a wide geographical area, it will be necessary to provide individual power line connections for each of the resident subscribers such as that shown in the illustration of FIG. 1.

In order for these individual power line connections (see FIG. 1) to be implemented without disrupting the transmission impedance, i.e. the impedance that an individual terminal must drive when transmitting over the power line, the individual subscriber terminals should either have a frequency selective termination, i.e. some sort of line tuner or filter, or an interface circuit which offers high bridging impedance. The cost of the power line interface circuits can no longer be shared among subscribers, but rather must be sustained by each individual subscriber. For this reason, the high bridging impedance interface circuit concept is desirable because all power line interface circuits may be made identical, rather than having a different line tuner design for each subscriber drop corresponding to the carrier frequency thereof. This, of course, will lower the cost individually of each subscriber terminal which accordingly lowers overall system costs by the number of individual terminals in the system.

To accomplish this high bridging impedance for power line interconnection, the instant application proposes an interface circuit coupled between the power line and communications terminal to provide high impedance to the carrier frequency communication signals present on the power line utilizing electronic means.

SUMMARY OF THE INVENTION

A communications terminal transmits and receives communication signals over a power line communications network and includes an interface circuit for coupling the terminal to a power line of the network. The interface circuit comprises apparatus for coupling the communication signals between the power line and the communications terminal and for measuring these coupled communication signals. Also included is apparatus governed by the measured communication signals to generate matched signals, representative of the measured communication signals. The matched signals are applied to the coupling apparatus to effect high bridging impedance to the communication signals present on the power line without impeding substantially the coupling of the terminal's own communication signals.

More specifically, the coupling apparatus may include a transformer having a first winding coupled to the power line and a second winding coupled to the generating apparatus and measuring apparatus. The transformer couples electromagnetically the communication signals present on the power line from the first winding to the second winding where they are measured by the measuring apparatus. The generating apparatus includes an amplifier circuit which is governed by the measured communication signals from the second winding to generate matched signals which are reapplied to the second winding of the transformer to cancel substantially the electromagnetically coupled communication signals from the power line, thereby providing a high bridging impedance to the power line communication signals.

In one embodiment, the amplifier circuit includes an output stage operative to drive the load associated with the second winding of the transformer and to support the cumulative voltage excursions associated with the generated matched signals. The output stage also generates the matched signals inverted in polarity to the communication signals electromagnetically coupled to the second winding.

DESCRIPTION OF THE PREFERRED EMBODIMENT

Figure 1:
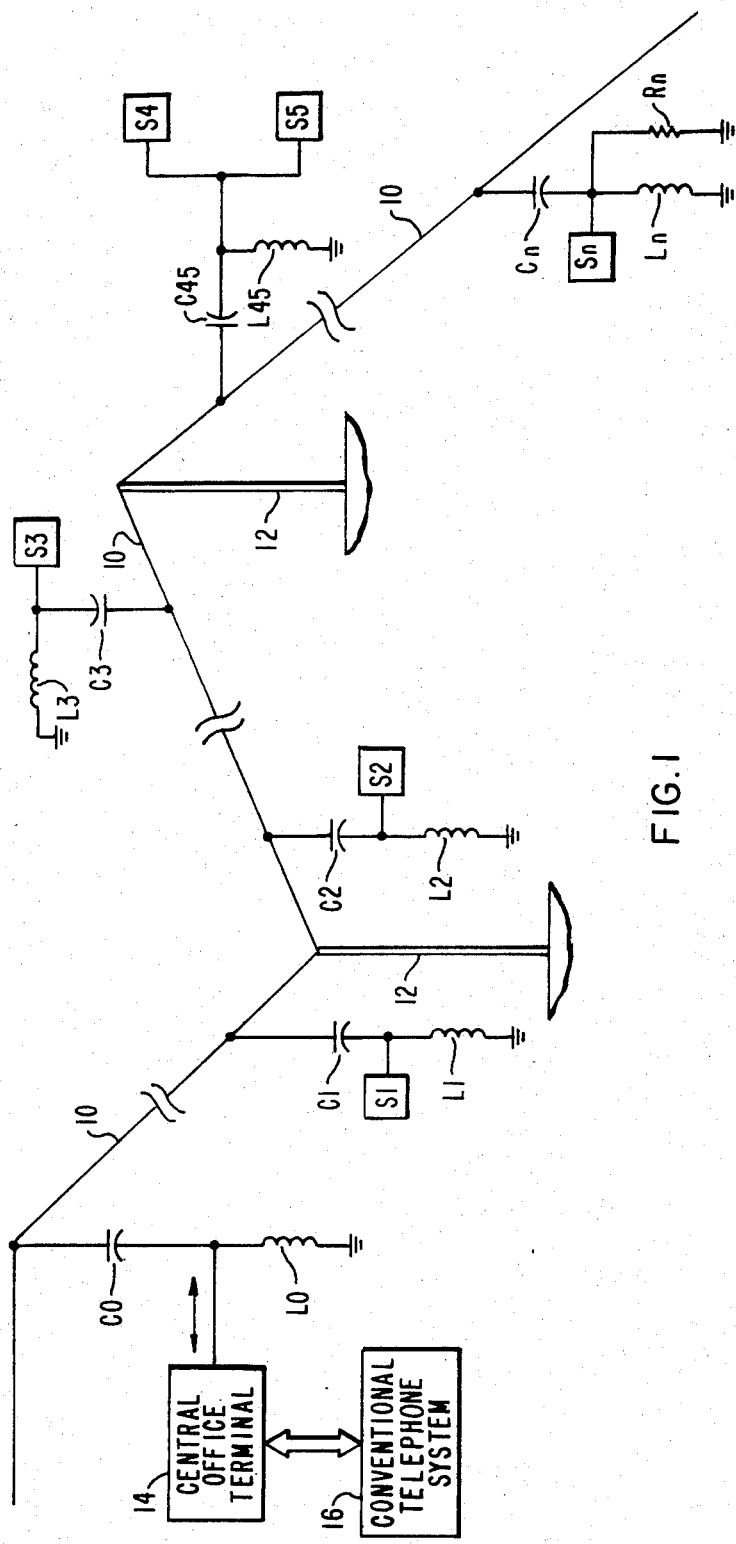
FIG. 1 is a schematic block diagram illustration of a power line communications network exemplifying a suitable environment for application of the present invention.

Referring to FIG. 1, a power line communications network typically comprises a power line 10 which may be extended through a community servicing a number of its residents and supported by a plurality of power line pole structures, like that shown at 12, for example, a central office terminal 14 and a plurality of individual subscriber terminals S1 through Sn. A typical communications channel of the network includes the central office terminal 14 which is coupled to a conventional telephone system 16, an individual subscriber terminal S1, for example, and the portion of the power line 10 interconnecting these two terminal units S1 and 14, which may be separated by 10–20 miles, for example.

Each of the central office and subscriber terminals of the communications network may be coupled to the power line 10 utilizing a line coupling capacitor C and a power line frequency drain coil L connected in series between the power line 10 and ground. In the present embodiment, the central office terminal 14 is coupled to the power line 10 at the series connection of capacitor C0 and drain coil L0, and the individual subscriber terminal S1 is coupled to the power line 10 at the series connection between the capacitor C1 and drain coil L1.

Correspondingly, the communications channels for the other individual subscriber terminals like those shown at S2, S3, . . . Sn may be similarly embodied with each individual subscriber terminal being coupled to the power line 10 using a similar series circuit arrangement of line coupling capacitor and power line frequency drain coil. In some situations, two or more individual terminals like those shown at S4 and S5, for example, may be coupled to the power line 10 using a common capacitor and drain coil pair C45 and L45, respectively. Accordingly, a communications channel for transmitting and receiving communication signals over the power line network may be embodied for each individual subscriber in accordance with the foregoing description of the typical power line communications network of FIG. 1.

In operation, a telephone call initiating through the conventional telephone system 16 and destined for subscriber S3, for example, may have its conventional voice content signal coupled to the central office terminal 14 wherein it is converted to the transmission carrier frequency assigned to the subscriber terminal S3 and transmitted over the power line 10 through the line coupling capacitors C0 and C3 to the subscriber terminal S3 which recognizes and accepts the frequency carrier signal, converts it back to its voice content signal, and passes the converted signal to the subscriber's telephone head set. It is understood that while only the individual terminal S3 of the power line communications network recognizes and accepts the particular carrier frequency signal corresponding to the call, the central office terminal 14, during transmission of the carrier frequency signal, actually drives all of the individual subscriber terminals through their line coupling capacitors.

Conversely, if the telephone call is initiated at an individual subscriber terminal, say S3 for example, it transmits the voice signal of the call using its assigned carrier frequency over the power line 10. This transmitted carrier frequency signal corresponding to the call is coupled to all of the individual subscriber terminals and central office terminal through their respective line coupling capacitors, but is is only the central office terminal 14 which recognizes and accepts the carrier frequency signal and determines that a call is being placed. In response, the central office terminal 14 may convert the carrier frequency signal to a conventional voice signal and may couple the converted signal to the conventional telephone system 16 for transmission over conventional telephone lines to the receiving party.

With regard to the line coupling circuits, the line coupling capacitors C may be designed at such a value to offer a very high impedance to the power line frequency causing the voltage drop associated therewith to occur primarily across the coupling capacitor C and to offer a relatively low impedance to the carrier frequency signalling rendering very little voltage drop to the transmission and reception thereof. On the other hand, the drain coils L at each terminal may be designed at a value to offer very high impedance to the frequency carrier signals and a very low impedance to the power line frequency signals. Normally, the last individual terminal coupled along a power line from the central office terminal 14 like that shown at Sn, for example, may include a terminating impedance with regard to the carrier frequency distribution. In the present embodiment, this terminating impedance is accomplished by the impedance element Rn coupled to ground from the series connection between the capacitance Cn and drain coil Ln.

As has been described in the Background section hereabove, in order for the individual subscriber terminals to transmit carrier frequency signals over the power line without an undue power burden, it will be necessary for the subscriber terminals to either have a frequency selective termination, like a tuner or filter, for example, or to offer high impedance to the carrier frequency signals being transmitted by all of the other terminals of the network. If a tuner or filter method is chosen for coupling the subscriber terminal to the power line, a different design will be needed for each individual terminal because of the particular carrier frequency assigned to each individual terminal. That is, the tuner or filter apparatus must act as a low impedance network to the assigned carrier frequency signal and a high impedance network to all of the other carrier frequency signals being transmitted by the other individual terminals.

With regard to the individual terminals, the method of providing each terminal with its own tuner or filter will not only require separate designs but the individual terminal unit itself will have to absorb the cost of the tuner or filter network itself. This may increase the cost per individual terminal to a prohibitive situation. On the other hand, a high bridging impedance interface circuit may have a common design for each of the individual subscriber terminals and be less costly than the individual designs of the interface tuner networks because of the higher volume in the production thereof.

Figure 2:
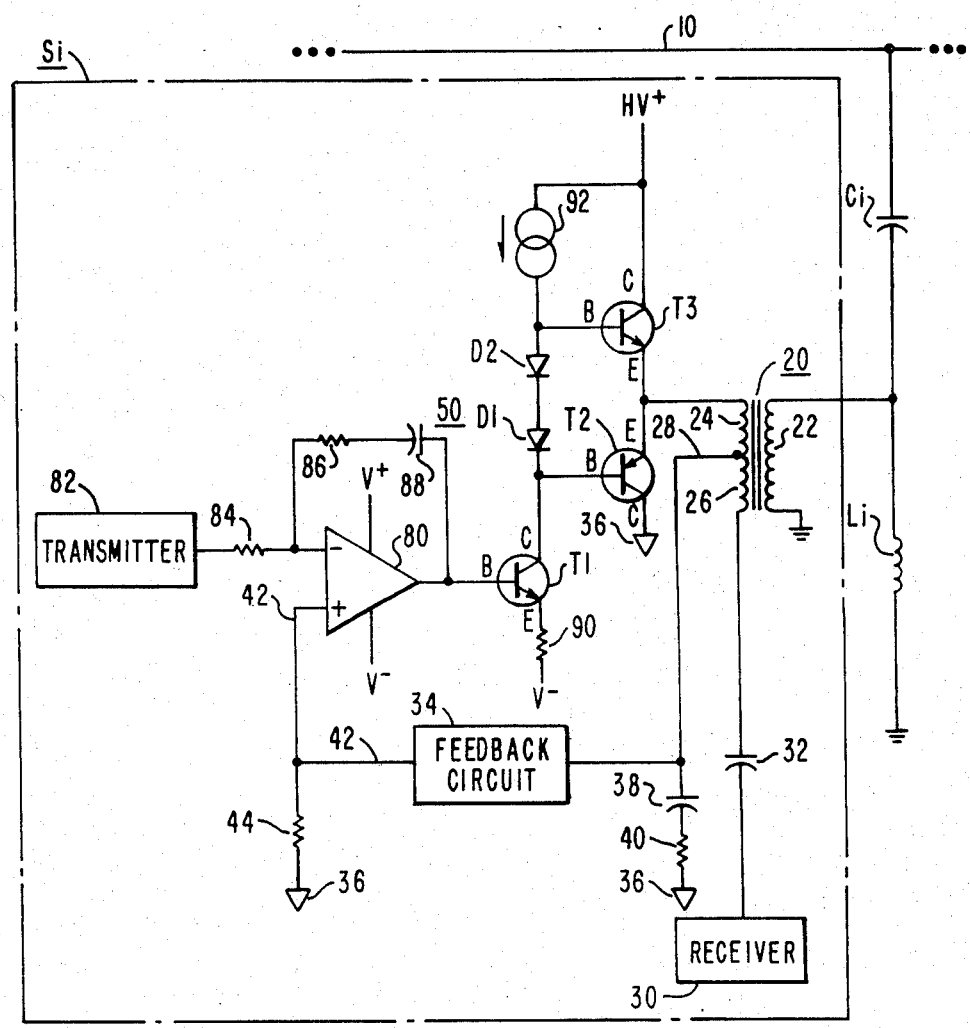
FIG. 2 is a schematic diagram of a communications terminal and interface circuit associated therewith suitable for embodying the principles of the present invention.

In accordance with the present invention, a simplified circuit schematic of a power line interface circuit of a subscriber terminal which provides high bridging impedance to communication signals present on the power line without impeding substantially the transmission and reception communication signals of the terminal itself is shown in FIG. 2. Referring to FIG. 2, a typical subscriber terminal Si may be coupled to the power line 10 using the previously described capacitor/drain coil series connection Ci and Li.

An interface circuit may include apparatus 20 which may be a transformer, for example, for electromagnetically coupling communication signals between the power line 10 and the communications terminal Si. In the present embodiment, a transformer is shown at 20 having a first winding 22 coupled at one end to the power line 10 through the line coupling capacitor Ci and at the other end to ground. A second winding 24 may be used for electromagnetically coupling the carrier frequency communication signals of the terminal to the winding 22 for transmission over the power line 10. Another winding 26 may be utilized for receiving carrier frequency communication signals electromagnetically coupled through the transformer 20 from the primary winding 22. The windings 24 and 26 may be a part of the secondary windings of the transformer 20 and divided by a tapped connection shown at 28. The winding 26 may be coupled to a conventional receiver portion 30 of the subscriber terminal Si through a capacitive element 32.

In the present embodiment, a feedback circuit 34 may be coupled to the tap connection 28 of the secondary winding of the transformer 20 for measuring the carrier frequency communication signals present on the power line as electromagnetically coupled through the transformer 20. The feedback circuit 34 is operative to generate matched signals over the signal line 42 which appear as voltage signals across a resistive element 44 which is coupled between the signal line 42 and the common potential 36. The matched signals are representative of the carrier frequency communication signals measured from the transformer 20 via tap pickup 28. To assist in this measurement operation, a filtering network may be coupled between the transformer tap 28 and a common reference potential 36 of the subscriber terminal Si. In the present embodiment, this filter network comprises the series connection of a capacitive element 38 and resistive element 40.

The feedback circuit 34 may include an electronic filter which is operative to pass the measured carrier frequency signals which govern an amplifier circuit shown at 50 and to provide rejection of higher frequency signals at a predetermined "roll off" to render compensation and stability to the amplifier circuit 50. The circuit schematic of FIG. 3 exemplifies an electronic filter suitable for use in the feedback circuit 34 of the subscriber terminal Si.

Figure 3:
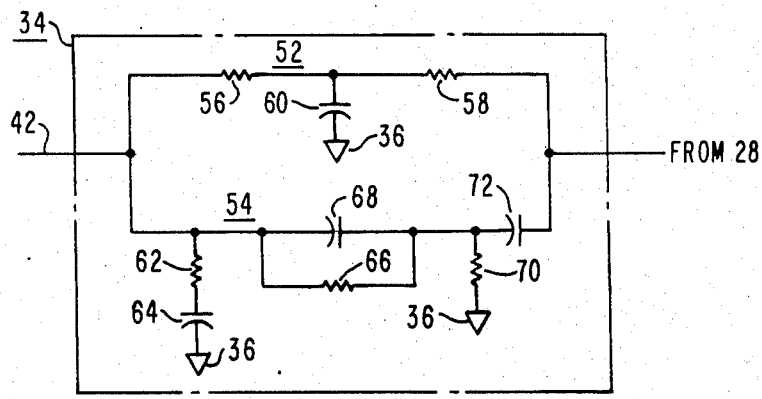
FIG. 3 is a circuit schematic of an electronic filter suitable for use in the feedback circuit of the embodiment depicted in FIG. 2.

Referring to FIG. 3, the exemplary filter network includes parallel circuit paths 52 and 54, one for passing essentially DC signalling and the other 54 for passing the measured carrier frequency signalling and providing the predetermined amplifier compensation. The path 52 comprises two resistive elements 56 and 58 connected in series with a capacitive element 60 coupled between the series connection and the terminal common 36. The capacitive element 60 may be designed such to offer low impedance to frequency signalling above frequencies relatively close to zero frequency or DC. Accordingly, the circuit path 52 is thus operative to pass DC signalling and low frequency signals substantially close thereto.

The other circuit path 54 includes a complex capacitive-resistive circuit arrangement for passing the measured carrier frequency signals and rendering the designated "roll off" rejection to higher frequency signals. The path 54 comprises a series resistor 62 and capacitor 64 coupled between the terminal common 36 and line 42. In series along the path 54 therewith is a parallel circuit arrangement of resistor 66 and capacitor 68. Next in series along the path 54 is a resistor 70 coupled to the terminal common 36 and a capacitor 72 coupled to the input of the filter at line 28.

In operation, the carrier frequency signals from the tap 28 enter the filter network of the feedback circuit 34 and are split between the paths 52 and 54. The signals having DC and substantially low frequency content substantially close to DC are passed through the circuit path 52 to the output 42. Similarly, the signal content of the measured carrier frequencies are passed through the circuit path 54 to the output 42. As described above in connection with FIG. 2, the filter passed signals of 34 constitute the matched signals conducted over line 42 which are representative of the carrier frequency signals measured from the transformer 20 and appear as voltage levels across the resistor 44.

Referring to FIG. 2, the amplifier circuit 50 for the purposes of the present embodiment may comprise an operational amplifier 80 powered by supply potentials V+ and V− and a 3-transistor circuit arrangement constituting an output stage of the operational amplifier 80 which is operative to drive the load associated with the secondary winding of the transformer 20. More specifically, a conventional transmitter portion 82 of the subscriber terminal Si may be coupled to inverting input (−) of the amplifier 80 through a resistive element 84. And the signal line 42 may be coupled to the non-inverting (+) input thereof. Coupled between the output and inverting input of the amplifier 80 is a series network of resistive element 86 and capacitive element 88. Moreover, the output of the amplifier 80 is coupled to the base of a transistor T1 which is one of the transistors of the output stage. In the present embodiment, the transistor T1 is an NPN transistor having its emitter (E) coupled to the voltage supply V− through a resistive element 90. The collector (C) of transistor T1 is coupled to the base (B) of another transistor T2, which is a PNP type, and the cathode of one of two diodes D1 and D2 which are in series connection. The anode of diode D2 is coupled to the base (B) of a third transistor T3 of the output stage and also to a conventional current source 92 which receives its supply from a high voltage power supply source HV+ of the subscriber terminal. The supply HV+ is also coupled to the collector (C) of the transistor T3 which is an NPN type. The emitters of transistors T3 and T2 are connected together and coupled to the secondary coil 24 for driving the load associated therewith. The collector of the PNP transistor T2 may be coupled to the terminal common 36.

In operation, the operational amplifier 80 is governed both by the carrier frequency signalling of the subscriber terminal which is to be transmitted over the power line 10 generated from the transmitter portion 82 and by the matched signals over signal line 42 which are representative of the measured carrier frequency communication signals present on the power line 10 as coupled through the transformer 20. As a result of the input connection of the governing signals, the cascaded operation of the amplifier 80 and transistor T1 results in a double polarity inversion of the terminal's carrier frequency transmission signal and only a single inversion of the polarity of the generated matched signals. The transistor combination T2 and T3 cooperate to amplify the generated voltages at the collector of transistor T1 which have the aforementioned polarity.

The transistor pair T2 and T3 is operative to support the cumulative voltage excursions associated with the generated matched signals corresponding to all of the communication signals present on the power line. In addition, there is no polarity change during the amplification performed by the transistor pair T2 and T3 and thus the terminal's carrier frequency signalling is transmitted via transformer 20 at the proper polarity. However, the amplified matched signals are inversed in polarity to the power line carrier frequency signals coupled to the coil 24 so that when the winding 24 is driven by the output stage, i.e., the emitter coupled pair of transistors T2 and T3, substantially no current will flow therethrough as a result of the coupled power line signals. In effect, the amplified matched signals applied to the winding 24 cancel substantially the electromagnetically coupled signals from the power line. Accordingly, the aforementioned operation of the interface circuit effects a high bridging impedance (i.e. substantially no current flow) to the communication signals present on the power line without impeding substantially the coupling of the terminal's own communication signals through the transformer 20.

While the present invention has been described hereabove in connection with a specific embodiment depicted in FIGS. 2 and 3, it should not be so limited, but rather construed in breadth and broad scope in accordance with the recitation of the appended claims.

I claim:

1. A power line interface circuit coupled between a power line and a communications terminal for providing high bridging impedance to communication signals present on said power line without impeding substantially the transmission and reception communication signals of said terminal, said interface circuit comprising:

means for coupling communication signals between said power line and said communications terminal;

means for measuring the communication signals present on said power line from said coupling means; and means governed by said measured communication signals to generate matched signals, representative of said measured communication signals, which are applied to said coupling means to effect high bridging impedance to said communication signals present on said power line without impeding substantially the transmission and reception communication signals of said terminal.

2. The power line interfacing circuit in accordance with claim 1 wherein the coupling means includes a transformer having a first winding coupled to the power line and a second winding coupled to the generating means and measuring means, said transformer operative to couple electromagnetically the communication signals present on the power line from the first winding to the second winding; wherein the measuring means includes means for measuring the communication signals coupled electromagnetically to the second winding of said transformer; and wherein the generating means includes an amplifier circuit governed by the measured communication signals to generate matched signals, representative of the measured communication signals, which are applied to said second winding of said transformer to cancel substantially the electromagnetically coupled communication signals from the power line, thereby providing a high bridging impedance to said power line communication signals.

3. The power line interfacing circuit in accordance with claim 2 wherein the measuring means includes an electronic filter operative to pass the measured communication signals to govern the amplifier circuit and to provide compensation for the amplifier circuit.

4. The power line interfacing circuit in accordance with claim 2 wherein the amplifier circuit includes an output stage operative to drive the load associated with the second winding of the transformer and to support the cumulative voltage excursions associated with the generated matched signals corresponding to all of the communication signals present on the power line.

5. The power line interfacing circuit in accordance with claim 2 wherein the amplifier circuit includes an output stage which generates the matched signals inverted in polarity to the communication signals electromagnetically coupled to the second winding.

6. A communications terminal for transmitting and receiving communication signals over a power line communications network, said terminal including a power line interface circuit for coupling said terminal to a power line of said network, said interface circuit comprising:

means for coupling communication signals between said power line and said communications terminal;

means for measuring the communication signals present on said power line from said coupling means; and means governed by said measured communication signals to generate matched signals, representative of said measured communication signals, which are applied to said coupling means to effect high bridging impedance to said communication signals present on said power line without impeding substantially the transmission and reception communication signals of said terminal.

7. The communications terminal in accordance with claim 6 wherein the coupling means includes a transformer having a first winding coupled to the power line and a second winding coupled to the generating means and measuring means, said transformer operative to couple electromagnetically the communication signals present on the power line from the first winding to the second winding; wherein the measuring means includes means for measuring the communication signals coupled electromagnetically to the second winding of said transformer; and wherein the generating means includes an amplifier circuit governed by the measured communication signals to generate matched signals, representative of the measured communication signals, which are applied to said second winding of said transformer to cancel substantially the electromagnetically coupled communication signals from the power line, thereby providing a high bridging impedance to said power line communication signals.

8. The communications terminal in accordance with claim 7 wherein the measuring means includes an electronic filter operative to pass the measured communication signals to govern the amplifier circuit and to provide compensation for the amplifier circuit.

9. The communications terminal in accordance with claim 7 wherein the amplifier circuit includes an output stage operative to drive the load associated with the second winding of the transformer and to support the cumulative voltage excursions associated with the generated matched signals corresponding to all of the communication signals present on the power line.

10. The communications terminal in accordance with claim 7 wherein the amplifier circuit includes an output stage which generates the matched signals inverted in polarity to the communication signals electromagnetically coupled to the second winding.

* * * * *